(No Model.) 3 Sheets—Sheet 1.

F. P. SHERMAN.
CENTRIFUGAL MACHINE.

No. 345,994. Patented July 20, 1886.

WITNESSES:
O. M. Hill
Jno. W. Prehli

INVENTOR
Frank P. Sherman
per Wm. Hubbell Fisher
ATTORNEY

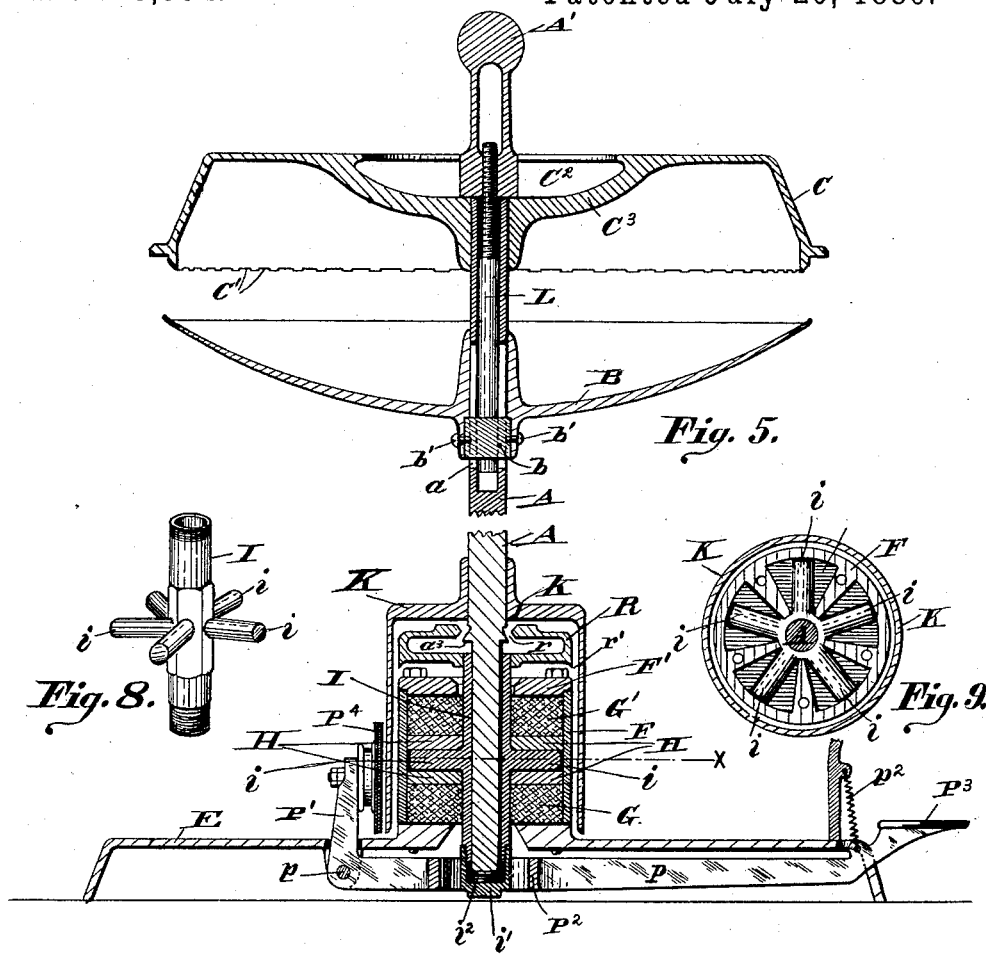

(No Model.) 3 Sheets—Sheet 3.

F. P. SHERMAN.
CENTRIFUGAL MACHINE.

No. 345,994. Patented July 20, 1886.

WITNESSES:
O. M. Hill
Jno. W. Strehli

INVENTOR
Frank P. Sherman
per Wm. Hubbell Fisher
ATTORNEY

UNITED STATES PATENT OFFICE.

FRANK P. SHERMAN, OF CINCINNATI, OHIO, ASSIGNOR TO THE A. M. DOLPH COMPANY, OF SAME PLACE.

CENTRIFUGAL MACHINE.

SPECIFICATION forming part of Letters Patent No. 345,994, dated July 20, 1886.

Application filed October 21, 1885. Serial No. 180,510. (No model.)

*To all whom it may concern:*

Be it known that I, FRANK P. SHERMAN, a resident of Cincinnati, Hamilton county, and State of Ohio, have invented certain new and useful Improvements in Centrifugal Machines, of which the following is a specification.

The various features of my invention and their uses and advantages, conjointly or otherwise, will be apparent from the following specification.

Figure 1:
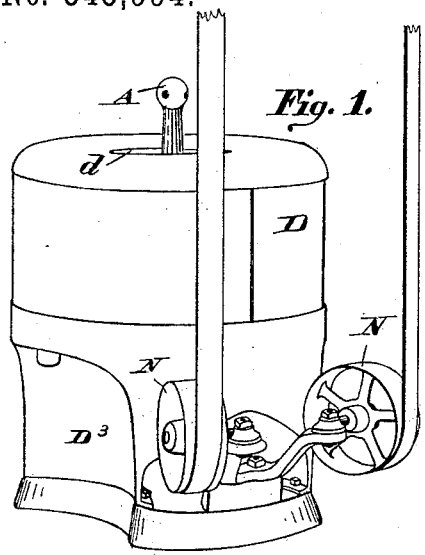
Figure 2:
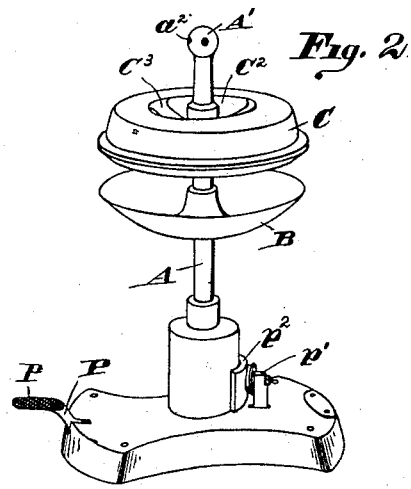
Figure 3:
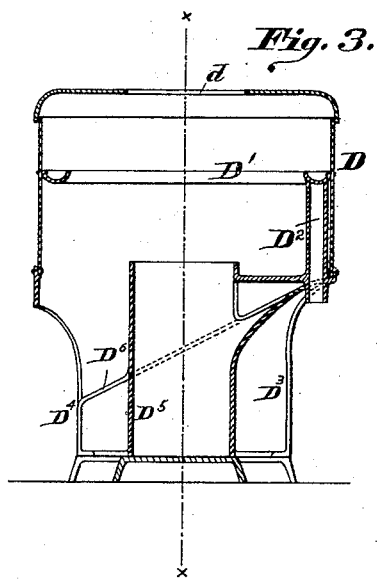
Figure 4:
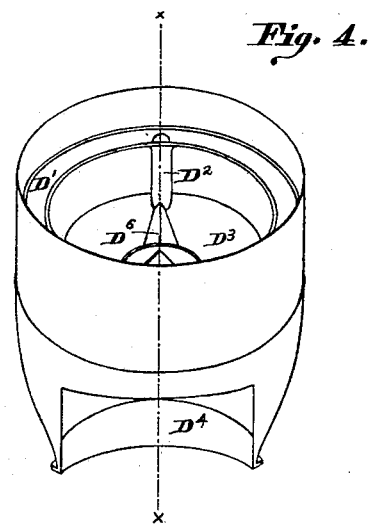
Figure 11:
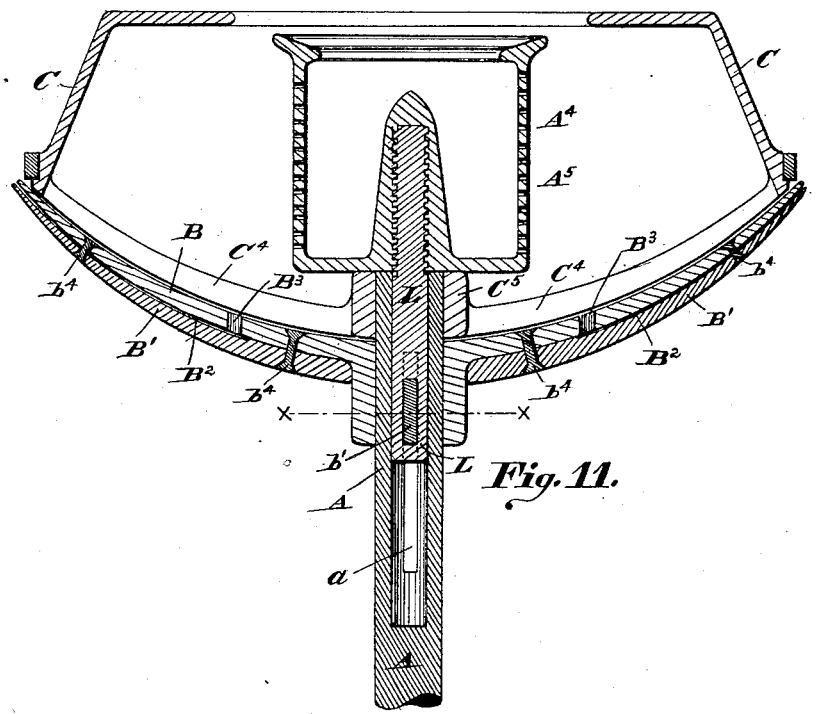
Figure 12:
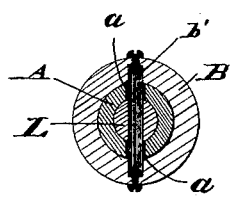

In the accompanying drawings, Figure 1, Sheet 1, is a perspective view of my machine. Fig. 2, Sheet 1, is a perspective view of the parts directly attached to the central stem. Fig. 3, Sheet 1, is a vertical central section taken at the line $x$ $x$ in Fig. 4. Fig. 4, Sheet 1, shows in perspective the interior of the casing. Fig. 5, Sheet 2, is a vertical central section of the entire machine except the casing. Fig. 6, Sheet 2, is a vertical central section of a modified form of part of the device for raising and lowering the containing-basin. Fig. 7, Sheet 2, shows two views of the bearing pieces or brasses. Fig. 8, Sheet 2, is a perspective view of the hollow standard supporting the stem. Fig. 9, Sheet 2, is a cross-section taken at the line $x$ of Fig. 5. Fig. 10, Sheet 2, is a view of the under surface of the cap-covering of the bearing-seat. Fig. 11, Sheet 3, is a vertical central section of a modified form of the separating-chamber. Fig. 12, Sheet 3, is a cross-section taken at the line $x$ $x$, Fig. 11.

The stem A has centered upon it the basin B, which latter may be raised and lowered upon the said stem. Also rigidly centered upon the stem A is an inverted basin or cap, C, having openings in its top, through which material may be introduced into the basin B. When the basin B is brought up against the cap C, they together form a receiver in which the separation of the solid and liquid materials occurs.

Means are provided for imparting rapid rotary motion to the stem A, which motion is imparted to the receiver also. A proper casing, D, surrounds the whole, and is provided with a trough for catching the separated liquid.

The details of construction are as follows: A base, E, is first provided, on which (through the interposition of parts to be described) the stem A rests. The great speed at which the machine is run requires that the stem A should be so supported as to allow it a certain amount of lateral motion in all directions, which motion is also to be resisted until it is comparatively checked. If this slight movement were not allowed for, the entire machine would soon be jarred to pieces. This setting for the stem A is arranged as follows: A block or cylinder, F, is firmly bolted to the base E. The block F is circular in outline externally, and within is cored out from top to bottom, so as to form a central cylindrical opening, from which proceed outwardly gradually-enlarging fan-shaped recesses $f$. These recesses $f$ also extend vertically through the whole length of the block, and are preferably five or seven in number. Into each of the recesses $f$ is placed a piece of tough rubber, (or other resilient material,) G, shaped to fit the recess. A bearing brass or pillow-block, H, is now slipped into each recess. These blocks have lateral wings $h$, so shaped as to fit the recess, and are also provided with a groove, $h'$, in which a round lug rests. The standard I consists of a hollow cylinder, from which project a series of these round lugs $i$, corresponding in number to the recesses $f$. The standard I fits into the central opening in the block F, and its lugs $i$ respectively fit into the respective grooves $h'$ of the pillow-blocks H. A cap or block, H, corresponding to the one below is now slipped over each lug $i$, and the remaining space in the recesses $f$ is filled by rubber or other elastic blocks, G'. The whole is now covered in by the cap F'. This cap is provided with projections $f'$, which correspond to and fit into the recesses $f$. Extending below the general surface of the cap F', these projections serve to compress the rubbers G G' when the cap is screwed home. The cap F is provided with an opening, $f^2$, which slips over the standard I. An oil-receiver, R, is shrunk or otherwise secured to the top of the standard I. This oil-receiver will be more fully described further on. The stem A passes through an opening in the cap F' and fits into the standard I, where it rests on the washers $i^2$, held in the bottom of standard I by the cap I'. The diameter of the space inclosed by the cap I' is somewhat greater than the diameter of the space inclosed by the standard I, for the purpose of forming an oil-receptacle around the lower end of stem A. There is keyed onto or otherwise secured to the stem A a hollow cap, K, which entirely surrounds the block F and oil-receiver R, there being some space between them. The cap K is also raised some distance above the base E. The cap K serves as the belt-wheel by means of which motion is imparted to the machine. An opening, $k$, in the cap K permits oil to be fed to the receiver R. The oil enters the receiver through the opening $r$, and is prevented from being thrown out again by the shoulders $a^3$ on the stem A. If, however, any oil should escape from the receiver, it would run over the top and be directed by the dripping-rim $r$ into the space between the cap K and the block F, where it could not reach, and consequently could not harm, the rubbers. The oil in the receiver lubricates the joint between stem A and standard I. The upper part of the stem A is bored out to receive the rod L. Slots $a$ are cut through the stem A into its central channel, and through these slots a key, $b$, passes, securing the basin B to the rod L. The key $b$ is preferably secured to the basin B by the screws $b'$. This arrangement (shown in cross-section in Fig. 12) permits of the basin B sliding up and down on the stem at the same time the basin turns with the stem. The upper end of the rod L has a thread tapped upon it and screws into the hollow handle A'. The handle A' may be turned directly by hand or by the aid of levers inserted in the holes $a^2$. The lower edge of the cap C is preferably provided with small notches C', and at the top of the cap C openings $C^2$ exist between the arms $C^3$. A flange, $C^4$, encircles the cap C slightly above its lower edge. When the basin is drawn up to the cap, the edge of the cap rests within the edge of the basin, as can be seen from Fig. 5. The casing D, which surrounds the stem and its appendages, rests on the base E and covers over the entire machine, except the handle A', which projects through the large opening $d$ in the top. A gutter or trough, D', extends around the casing D on the inside, and its top is just below the level of the lower edge of cap C. Leading from this trough is a pipe, $D^2$, which passes downwardly through the top of the arch $D^3$, as shown in Fig. 3. The upper portion of the casing preferably consists of a cap or top, $m$, which is centrally provided with orifice or opening $d$. The upper surface of the top $m$ of the casing inclines downward from near its outer edge to the edge of opening $d$. When the mass or substance to be placed in the basin is introduced through the opening $d$ into the said basin, as B, any of such substance remaining on the top of said cap will move down the inclined surface of the latter and fall into the basin B. Within the frame D is a hollow cylinder, $D^5$, which surrounds the lower part of the stem. The bottom $D^6$ of the case D inclines downwardly from the top of the arch $D^3$ to about the middle of the arch $D^4$, and so much of the arch $D^4$ as is above the floor $D^6$ is open. Appropriate pulleys N U guide the belt M over the driving-pulley K. Motion is thus imparted to the machine. The brake is a bent lever consisting of the arms P P'. The long arm P extends under the base E, and at the angle the brake is fulcrumed to the lug $p$ from the base. For allowing the lever-arm to pass the standard I, a ring, $P^2$, in the arm P surrounds the said standard I. The end of the arm P is provided with a foot-plate, $P^3$. A spring, $p^2$, keeps the foot-plate elevated. A curved bearing-plate, $P^4$, is secured to the arm P', and when the foot-plate is depressed it (said plate $P^4$) bears against the surface of the belt-wheel K.

In Fig. 11 a modification of the separating-chamber is shown. In this modification the cap C is provided with ribs $C^4$, which extend from its periphery to the central ring, $C^5$. This ring $C^5$ is shrunk, keyed, or screwed to the top of the stem A, which is shorter than in the form shown in Fig. 5. Instead of the hollow standard A', I have in this modification a basket, $A^4$, screwed to the top of the stem A. Perforations $A^5$ are made in the sides of this basket. The basin B has a supplementary basin, B', attached to it by rivets $b^4$. A space, $B^2$, exists between the two basins B B', which space connects with the cavity of the basin B by means of openings $B^3$. In other respects the modification is substantially the same as the device already described.

The mode of operation is as follows: The basin B is first screwed up into position against the cap C. Into the reservoir thus formed is placed a quantity of mixed solid and liquid matters. Motion is now imparted to the machine, and this motion must be quite rapid. With this machine I have been able to use a speed of fifteen hundred revolutions per minute. In turning thus rapidly the centrifugal force developed throws the contents of the reservoir to its sides, where they have a strong tendency to fly off, but are prevented, of course, by the sides of the reservoir. The openings C' are too small to allow the passage of the solid matters, but they offer a ready exit to the liquid matter, and this latter flies through them with great force, strikes against the case, and drops into the gutter D', whence it is led off through the pipe $D^2$. In a few moments the solid matters are turned dry, the oil being driven off completely. The machine is now stopped, and the basin B is lowered. Run now at a slower rate, the chips are thrown out of the basin B, strike the case D below the gutter D', and fall on the slanting floor $D^6$, from which they roll out through the opening in arch $D^4$. The percentage of oil recovered in this way is very large, and the short time required to dry a reservoir full of turnings makes the operation profitable. This is not the only purpose for which the machine is adapted. It is merely mentioned to illustrate its method of operation. Its scope is very broad. It may be used to separate sirup from sugar, oils from solid fats, to dry clothes after washing, and, indeed, to separate any liquid from any solid which cannot pass through the openings C'.

The modification shown in Fig. 11 is particularly adapted for the extraction or separation of the water from white lead. The white lead or equivalent substance is introduced into the basket $A^4$, where the greater separation is effected. Passing into the basin B the water or liquid is thrown out of the small openings between the cap C and the basin B. When the lead or other solid substance has accumulated to some extent in the basin B and retards the action of the device, the space $B^2$ comes into play and still further assists the action.

While the various features of my invention are preferably used together, one or more of said features may be used without the remainder, and in so far as applicable one or more of said features may be employed in connection with centrifugal devices other than those specifically hereinbefore set forth.

What I claim as new and of my invention, and desire to secure by Letters Patent, is—

1. For centrifugal machines, a casing, D, having gutter D' and pipe $D^2$, and provided with arches $D^3$ $D^4$, and with an inclined floor, $D^5$, all substantially as and for the purposes specified.

2. A seat for the stem of a centrifugal machine, consisting of the block F, provided with recesses $f$, and in combination with the rubbers G G', sleeve I, provided with pins $i$, pillow-blocks H, and cap F, substantially as and for the purposes specified.

3. The combination of stem A, provided with slots $a$, the basin B, key $b$, rod L, and cap A', substantially as and for the purposes specified.

4. The combination of the stem A, provided with slots $a$, the basin, key $b$, annular collar or ring, and set-screws, substantially as and for the purposes specified.

5. The rotary stem provided with the shoulder $a^3$, and the oil-cup R, having opening and fixed to said stem, substantially as and for the purposes specified.

6. The rotary stem provided with the shoulder $a^3$, and the oil-cup R, having annular dripping-rim $r'$, extending beyond the periphery of the cylinder-seat of said stem, substantially as and for the purposes specified.

7. In a centrifugal machine, a basket provided with a separable bottom concave on its inner surface and capable of adjustment on the stem of the basket, substantially as and for the purposes specified.

8. In a centrifugal machine, a basket provided with a concaved separable bottom, substantially as and for the purposes specified.

9. In a centrifugal machine, the combination of the basin B, cap C, and inner basket, $A^5$, substantially as and for the purposes specified.

10. In a centrifugal machine, the combination of the basin B, provided with openings $B^3$, grooved bottom B', cap C, and basket $A^5$, substantially as and for the purposes specified.

11. The cap I', provided with enlarged cavity for lubrication and united to the standard I and stem A, substantially as and for the purposes specified.

12. In combination with cap C, the basin having grooves $B^2$ and openings $B^3$, as well as the opening C' between said basin and cap C, as and for the purposes set forth.

13. In combination with cap C, the basin and perforated vessel $A^4$, screwed onto stem A, as and for the purposes specified.

14. In combination with the basin B, the casing D, having cap $m$, provided centrally with opening $d$, and having the upper surface of its top inclined downward toward opening $d$, substantially as and for the purposes specified.

15. In a centrifugal machine, the combination of an imperforate cap, C, provided with grooves C', and a basin, B, forming a rim projecting under and beyond the edge of the cap C, substantially as and for the purposes specified.

16. In a centrifugal machine, the combination of the basin B and imperforate cap C, the latter being provided with the grooves C', substantially as set forth.

FRANK P. SHERMAN.

Witnesses:
JNO. W. STREHLI,
O. M. HILL.